United States Patent [19]

Henmi et al.

[11] 4,390,269
[45] Jun. 28, 1983

[54] COPYING MACHINE

[75] Inventors: Kojiro Henmi; Kiyosi Takenaka, both of Hikone, Japan

[73] Assignee: Dainippon Screen Manufacturing Co., Ltd., Kyoto, Japan

[21] Appl. No.: 279,949

[22] Filed: Jul. 2, 1981

[30] Foreign Application Priority Data

Jul. 10, 1980 [JP] Japan .............................. 55-97460[U]

[51] Int. Cl.³ ...................... G03B 27/32; G03B 27/52
[52] U.S. Cl. ......................................... 355/27; 355/51
[58] Field of Search .................................. 355/27–29, 355/51, 8, 11

[56] References Cited

U.S. PATENT DOCUMENTS

| | | | |
|---|---|---|---|
| 3,533,691 | 10/1970 | Suzuki et al. | 355/28 X |
| 3,535,037 | 10/1970 | Koizumi | 355/27 X |
| 3,535,038 | 10/1970 | Stievenart et al. | 355/28 X |
| 3,537,787 | 11/1970 | Murgas et al. | 355/29 |
| 3,656,851 | 4/1972 | Kakii et al. | 355/28 X |

Primary Examiner—Richard A. Wintercorn
Attorney, Agent, or Firm—Armstrong, Nikaido, Marmelstein & Kubovcik

[57] ABSTRACT

Disclosed is a copying machine for use in photomechanical process, which has a substantially box-shaped structure in appearance and employs a slit exposure system. A sensitive material is transferred along the ceiling surface, side wall and bottom surface of the box-shaped body of the machine in this order so that it can be exposed, developed and dried successively while it is being transferred. A slit exposure scanner makes reciprocatory movements horizontally in a space between an exposure zone positioned below the ceiling surface where the sensitive material is exposed while it is transferred horizontally along the ceiling surface and an original picture stand arranged immediately below the exposure zone so as to oppose thereto. On the bottom surface of the body, there are arranged a development tank, drying means, and a take-out tray for taking out the sensitive material after developed and dried.

7 Claims, 1 Drawing Figure

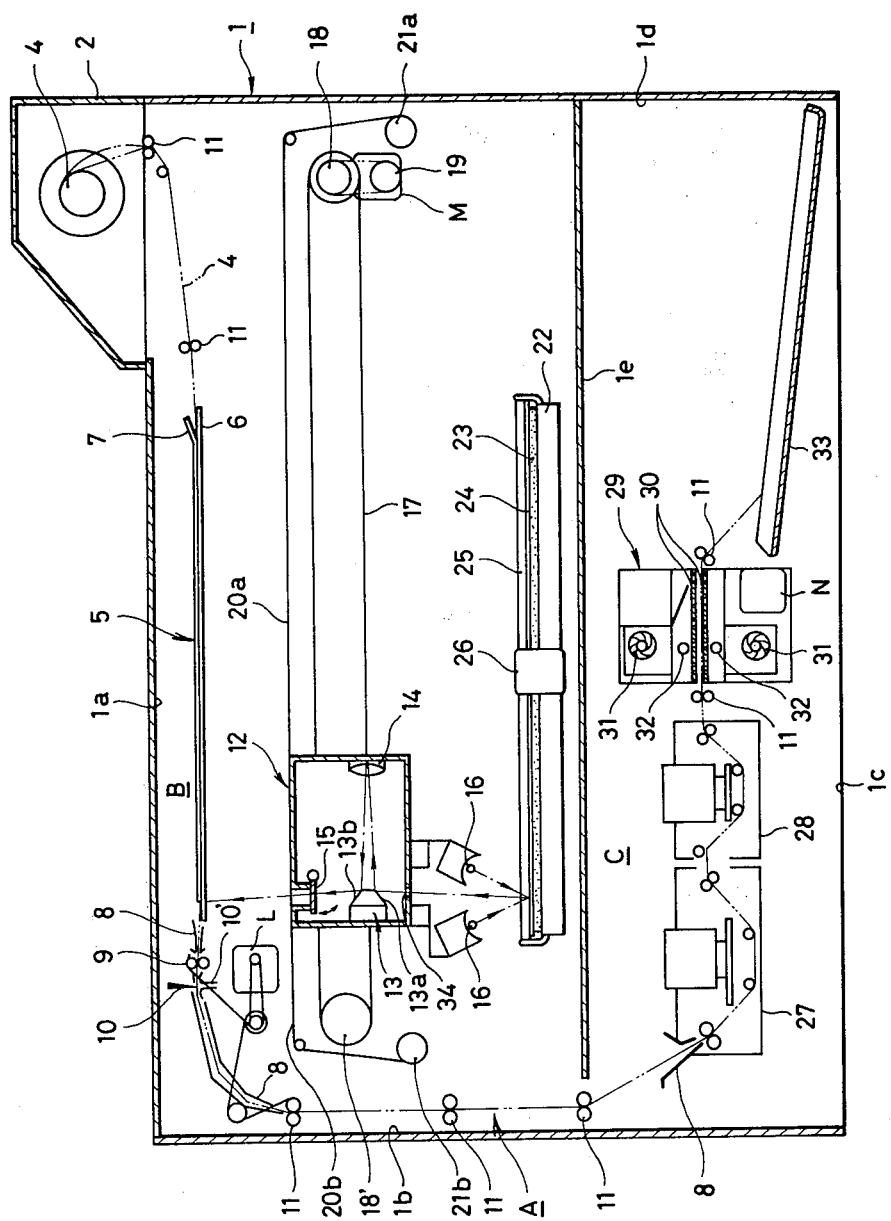

4,390,269

COPYING MACHINE

BACKGROUND OF THE INVENTION (1) Field of the Invention

The present invention relates to a copying machine and, more particularly, to a copying machine having a substantially box-like structure in appearance and employing a slit exposure system.

(2) Description of the Prior Art

A photomechanical copying machine is used for a direct exposure from a given original picture to a printing material (hereinafter referred to as sensitive material) or the exposure of an intermediate photograph for making a printing plate. Copying machines of this kind are classified, on the basis of structural characteristics, into a horizontal-bed type, an overhead type, a vertical type and a box-appearance type.

The last mentioned box-appearance type copying machine is advantageous over the remaining types of the copying machine in that the exposure on the sensitive material is protected against any external light; in that the light for exposure does not leak out of the machine body; and in that the machine can be designed to be compact so that the space for installation of the machine can be much saved.

The exposure system employed in conventional box-appearance type copying machines is a full-size simultaneous exposure system. This full-size simultaneous exposure system, though advantageous in the simplicity of the structure, requires a number of light sources for the exposure. Therefore, if an original picture to be copied is of a large size, the copying machine should inevitably be large-sized, too. As a result, the copying machine for copying a large size picture loses one of the advantages mentioned above, that is, the box-appearance copying machine can be designed to be compact so that the space required for installation thereof can be minimized.

SUMMARY OF THE INVENTION

It is therefore a primary object of the present invention to provide a copying machine of a box structure in appearance, which can copy a large size original picture with its compact structure.

The copying machine according to the present invention, which can attain the above-mentioned primary object and other objects which will become more apparent as the description proceeds, broadly comprises:

a transfer means for transferring a sensitive material first along the ceiling surface of the machine body in a substantially horizontal direction, then along one of side walls of the machine body in a substantially vertical direction, and finally along the bottom surface of the machine body in a substantially horizontal direction in this order, a photographing zone positioned within an upper part of the inside of the machine body, a developing zone positioned in a bottom space of the machine body, the photographing zone including an exposure zone positioned substantially horizontally so as to oppose the sensitive material transferred along the ceiling surface of the machine body, an original picture stand positioned immediately below and in parallel to the exposure zone, and a slit exposure scanner arranged between the exposure zone and the original picture stand so as to make reciprocatory movements in the lateral direction therebetween and forming images on the photosensitive surface of the sensitive material transferred into the exposure zone from an original picture set on the stand, and the development zone comprising a development tank and a stabilizer tank arranged successively and horizontally through which the exposed material passes to be developed.

The copying machine of the invention having the above stated construction is characterized in that with its very compact structure as a whole, it can copy any large size pictures.

BRIEF DESCRIPTION OF THE DRAWING

The accompanying drawing show a schematic side view of a copying machine of the present invention with a part thereof removed away for an easy understanding of the inside of the machine.

DETAILED DESCRIPTION OF THE PREFERRED EMBODIMENT

The copying machine of the present invention as illustrated in the drawing includes transfer means A for transferring a sheet-like printing material or a sheet-like sensitive material 4 having a width of about 400 mm first along the ceiling surface 1a of the box-shaped machine body 1 in a substantially horizontal direction, then along the side wall surface 1b in a substantially vertical direction, and finally along the bottom surface 1c in a substantially horizontal direction, a photographing zone B arranged within an upper space inside the machine body 1 and a development zone C arranged in a bottom space of the machine body 1. The photographing zone B includes an exposure zone 5 which is substantially horizontally disposed so as to oppose the sensitive material 4 transferred along the ceiling surface 1a of the machine body 1, an original picture stand 22 positioned immediately below and parallel to the exposure zone 5, and a slit exposure scanner 12 arranged between the exposure zone 5 and the original picture stand 22 so as to make reciprocatory movements in a lateral direction therebetween. The development zone C comprises a development tank 27, a stabilizer tank 28, drying means 29 and a take-out tray 33.

At one end of the ceiling 1a of the machine body 1, on the right-hand side in the drawing, there is mounted a magazine 2 for housing a rolled-up sensitive material 4 with its sensitive surface outside.

The sensitive material 4 used in the present invention is of the positive type. The material 4 is drawn out of the magazine 2 as shown by a two-dot-dash line in the drawing.

The transfer means A for transferring the sensitive material 4 in the predetermined course within the machine body 1 comprises a plurality of pairs of rubber rollers 11, 11, a plurality of guides 8, and two electric motors L and M.

The rubber rollers 11 in pairs are so arranged as to make a path along which the sensitive material 4 is transferred along the ceiling surface 1a, the side wall 1b and the bottom surface 1c of the machine body 1 with an approprite interval between the adjacent pairs.

The guides 8 are arranged in the course of the sensitive material 4 transferring path, two of which are on the outlet side of the exposure zone 5 (on a left upper portion in the drawing) and one of which is on the inlet side of the development tank 27 (on a left lower portion in the drawing).

The motor L is positioned on the outlet side of the exposure zone 5 and connected to the rubber rollers 11 positioned on both inlet and outlet sides of the exposure zone 5 by an endless chain (not shown). This motor L draws the sensitive material rolled up in the magazine 2 out of the magazine and through the exposure zone 5 within the photographing zone B along the ceiling surface 1a.

A motor N is mounted within the drying means 29 and connected to the rubber rollers 11 and 11 on both inlet and outlet sides of the drying means 29 by an endless chain (not shown). The motor N operates to transfer the sensitive material 4 having been exposed through the development tank 27, the stabilizer tank 28, the drying means 29 and the take-out tray 33.

The exposure zone 5 includes a glass plate 6 and a sensitive material tap 7 overlapped on the glass plate 6. The sensitive material 4 drawn out of the magazine 2 passes through the gap defined between the glass plate 6 and the tap 7. The tap 7 presses the passing sensitive material 4 against the glass plate with an even pressure by its own weight. The sensitive material tap 7 has a tape (not shown) attached to a lower surface portion thereof. The tape is made of a synthetic resin and formed with a linear convex-concave pattern on the surface. The tape prevents the sensitive material 4 from slipping off and generation of static electricity by the convex parts of the pattern.

Within the space between the two guides 8 on the outlet side of the exposure zone 5, there are arranged a tap roll 9 and cutter knife 10. The tap roll 9 prevents the sensitive material 4 from being displaced when it is cut by the cutter knife 10. The cutter knife 10 makes substantially vertical reciprocative movements at right angles to the advancing direction of the sensitive material 4. The reciprocatory movements of the knife 10 are guided by a guide groove 10' arranged below the cutter knife 10.

The original picture stand 22 is disposed within the machine body 1 in a manner such that it can be pulled out from the machine body 1 through a window (not shown) by an operator. The upper surface of the stand 22 is covered by a sponge sheet 23. A number of coil springs are contained inside the stand 22 to impart an upward elasticity to the stand 22. A given original picture 24 is placed on the sponge sheet 23 and pressed by a glass plate 25 into an intimate contact with the glass plate 25. The reference numeral 26 in the drawing denotes a hook which grips the sponge sheet 23, the original picture 24 and the glass plate 25 or loosens the gripping thereof.

The slit exposure scanner 12 is substantially box shaped and houses therein a reflecting mirror 13, an inmirror type lens 14, and a shutter 15 driven by a rotary solenoid. Below and outside the scanner 12, there are suspended a pair of elongated light source lamps 16, 16.

The slit exposure scanner 12 is pulled from both sides by a driving tape 17 to make reciprocatory movements in the horizontal direction. The driving tape 17 is an endless tape holding the exposure scanner 12. The tape 17 is supported by a pair of pulleys 18 and 18' positioned on both sides of the scanner 12 and wound up around the same. One of the pulleys allotted with a numeral 18 in the drawing is driven by a reversible motor M through a transmission 19.

To respective ends of the upper surface of the scanner 12 is connected one end of each of light shielding curtains 20a and 20b, the other ends of which are fixed to spring rollers 21a and 21b respectively.

Light shielding curtains 20a and 20b prevent any light from leaking through any other part than the shutter 15 and from reaching the sensitive material 4. In operation, when the scanner 12 moves from the left-hand to the right-hand in the drawing, one of the curtains allotted with the numeral 20a is wound up by one of the spring rollers allotted with the numeral 21a positioned on the right-hand side of the machine body 1. On the contrary, when the scanner 12 moves in the reverse direction, the other curtain 20b is wound up by the other spring roller 21b positioned on the left-hand side of the machine body 1.

The reference numeral 34 denotes a slit provided in the bottom surface of the scanner 12.

In operation, when the motor M is driven in one direction, the slit exposure scanner 12 is moved by the driving tape 17 from the left-hand to the right-hand in the drawing. In this particular embodiment of the invention, the left-hand motion limit point of the scanner 12 is named an exposure starting point whereas the right-hand motion limit point is named an exposure terminating point. When the scanner 12 starts moving from the exposure starting point, the shutter 15 opens simultaneously and the light source lamps 16 are lighted.

The light from the lamps 16 and 16 is irradiated on the original picture 24 and reflected therefrom. The reflected light, then, enters the slit exposure scanner 12 through the slit 34 and reflects on one mirror surface 13a of a reflection mirror 13, the inmirror lens 14 and the other mirror surface 13b of the reflection mirror 13. The light thus reflected inside the box-shaped scanner 12 passes through the opened shutter 15 out of the scanner 12 to the exposure zone 5. The light then passes through the glass plate 6 of the exposure zone 5 to irradiate the photosensitive surface of the sensitive material 4 to form the image there corresponding to the image on the original picture.

Thus, the image on the original picture 24 is transmitted from part to part to the sensitive material 4 while the scanner 12 is scanning over the original picture 24.

The exposure terminating point is positioned at a point separated from the exposure starting point by a length required as a printing plate for use in a printing machine. A limit switch (not shown) is provided at the exposure terminating point for detecting out that the scanner 12 reaches the exposure terminating point.

When the limit switch detects the scanner arrival at the exposure terminating point, a detection signal is outputted therefrom to a control unit in the motor M. The motor M switches the rotation based on the detection signal from the normal direction to the reversed direction. The rotary solenoid of the shutter 15, responsive to the detection signal, closes the shutter 15. The light source lamps 16 are turned off. Thus, the exposure is completed.

The slit exposure scanner 12 is returned by the reversed rotation of the motor M to the exposure starting point. In this instance, the returning speed of the scanner 12 to the exposure starting point is higher than the going speed of the scanner 12 to the exposure terminating point. Such a speed change is carried out by the transmission 19.

In synchronism with the reverse rotation of the motor M, the motor L is driven to draw the sensitive material 4 out of the magazine 2, until the exposed portion of the material 4 has passed through the cutter knife 10. Thus, the material 4 is protected from being cut in a wrong place by the cutter knife 10 to injure the exposed part.

In this instance, however, if the material 4 is further proceeded into the development tank 27, the area of the sensitive material 4 entering between the cutter knife 10 and the outlet end of the exposure zone 5 is also proceeded into the development tank 27 without being exposed, because it is out of exposure during two succeeding exposures.

In order to avoid such an inconvenience, after the exposed part of the sensitive material 4 is cut off by the cutter knife 10, the motor L is driven to rotate in the reverse direction for a predetermined period of time so that the subject area of the sensitive material 4 is drawn back into the exposure zone 5. The length of the period during which the motor L is rotated adversely is determined corresponding to the distance from the outlet end of the exposure zone 5 to the cutter knife 10 and inputted into a timer preliminarily.

The development tank 27, the stabilizer tank 28, the drying means 29 and the take-out tray 33 are disposed in a line in a lower part of the machine body 1 from one side wall 1b to the other side wall 1d. The exposed material 4 thus cut off from the unexposed part by the cutter knife 10 is transferred by the motor N along the side wall 1b to the inlet of the development tank 27. Then, the exposed material 4 enters the development tank 27 and next into the stabilizer tank 28 adjacently disposed. The material 4 is further transferred to the drying means 29 and a duplication is completed.

The drying means 29 includes two chambers defined in upper and lower parts inside thereof and further two perforated plates 30 interposed between these chambers and forming a passage through which the material 4 is transferred. A straight through fan 31 is provided in each chamber for blowing the air existing around a heat source fin type heater 32 and heated thereby against the upper and lower surfaces of the exposed material 4 through many holes pierced in the plates 30. Thus, the exposed material 4 is dried by the hot air.

The perforated plate 30 functions to equalize the strength of the air blowing by the fan 31 without concentrating at a certain limited part on the material 4. Namely, the perforated plate 30 works as an air bearing and also as a counter-measure against fire occurrence in the heat source. The sensitive material 4 thus dried is piled up on the take-out tray in succession.

The motor N is used for not only transferring the sensitive material 4 but also driving the straight through fans 31.

As shown in the drawing, there is arranged a partition 1e between the photographing zone B and the development zone C for preventing a part of light from the light source lamps 16 from entering the development tank 27.

According to the copying machine of the present invention having such a construction as described in the foregoing, since the exposure is carried out by the use of a slit exposure scanner 12, the space between the original picture 24 and the exposure zone 5 can be reduced to such an extent as enables the slit exposure scanner 12 to reciprocate within the space. Therefore, if an original picture to be copied is large in size, it is unnecessary to enlarge the subject space unlike the cases of conventional full-scale simultaneous exposure type copying machines. Thus, the copying machine of the present invention, though relatively small in the construction, can copy a relatively large original picture.

The sensitive material transferring path is formed along the longest possible course within the machine body, that is, along the ceiling surface 1a, one side wall 1b and the bottom surface 1c of the machine body 1. Accordingly, the inside of the machine body 1 is most effectively utilized, which results in a compact construction of the copying machine.

In the conventional copying machine, the drying means 29 has been disposed outside the machine body, but in the copying machine according to the present invention, all of the development tank 27, the stabilizer tank 28, the drying means 29 and the take-out tray 33 can be housed in the machine body 1. Therefore, the appearance of the copying machine is much improved and the installation space is much saved.

The development tank 27 arranged on the bottom surface of the machine body 1 is separated completely from the slit exposure scanner 12 by the partition 1e, so that no influence is made on each other.

As described in detail above, according to the present invention, important characteristics inherent to the box-appearance type copying machine can be all obtained without impairing any of functions of the machine.

What is claimed is:

1. A copying machine comprising:
   transfer means for transferring a sensitive material first along a ceiling surface of a box-shaped body of said copying machine in a substantially horizontal direction, then along a side wall in a substantially vertical direction, and finally along a bottom surface in a substantially horizontal direction,
   a photographing zone arranged within an upper space in said machine body,
   a development zone arranged within a bottom space in said machine body, and
   a magazine mounted on the ceiling of the machine body for therein housing a rolled-up sensitive material,
   wherein said photographing zone includes an exposure zone positioned substantially horizontally so as to oppose said sensitive material transferred along said ceiling surface of the machine body, an original picture stand positioned immediately below and parallel to said exposure zone, and a slit exposure scanner arranged between said exposure zone and said original picture stand so as to make reciprocatory movements in a lateral direction therebetween for forming images on the photosensitive surface of said sensitive material, said images transferred into said exposure zone from an original picture set on said original picture stand, and
   said development zone comprises a development tank and a stabilizer tank arranged successively and horizontally through which said exposed material passes to be developed.

2. A copying machine as set forth in claim 1, wherein said development zone comprises a development tank, a stabilizer tank and a drying means arranged substantially horizontally through which said exposed material passes.

3. A copying machine as set forth in either claim 1 or claim 2, wherein there is provided a cutter knife for cutting said exposed part of the sensitive material on the outlet side of said exposure zone within the machine body, said cutter knife making substantially vertical reciprocatory movements at right angles with respect to the advancing direction of said sensitive material.

4. A copying machine as set forth in either claim 1 or claim 2, wherein said exposure zone comprises a sensitive material tap attached on the lower surface with a tape made of a synthetic resin and having a linear convex-concave pattern and a glass plate overlapped on said sensitive material tap with a gap therebetween through which said sensitive material can pass.

5. A copying machine as set forth in claim 2, wherein said drying means includes two chambers positioned substantially symmetrically in upper and lower parts of said drying means and further includes two perforated plates interposed between these two chambers to form a passage therebetween for said sensitive material to pass through, each of said two chambers housing therein a straight through fan and a light source fin type electric heater, so that the drying air heated by said heater is blown by said fan toward the sensitive material passage through said perforated plates.

6. A copying machine as set forth in either claim 1 or claim 2, wherein there is arranged a partition within the machine body for separating said photographing zone and said development zone from each other.

7. A copying machine as set forth in claim 2, wherein a take-up tray for storing said exposed sensitive materials after exposed and dried by said drying means is provided on the bottom of the machine body.

* * * * *